(No Model.)
S. P. PORTER.
BROOM AND DUST PAN HOLDER.
No. 276,462. Patented Apr. 24, 1883.
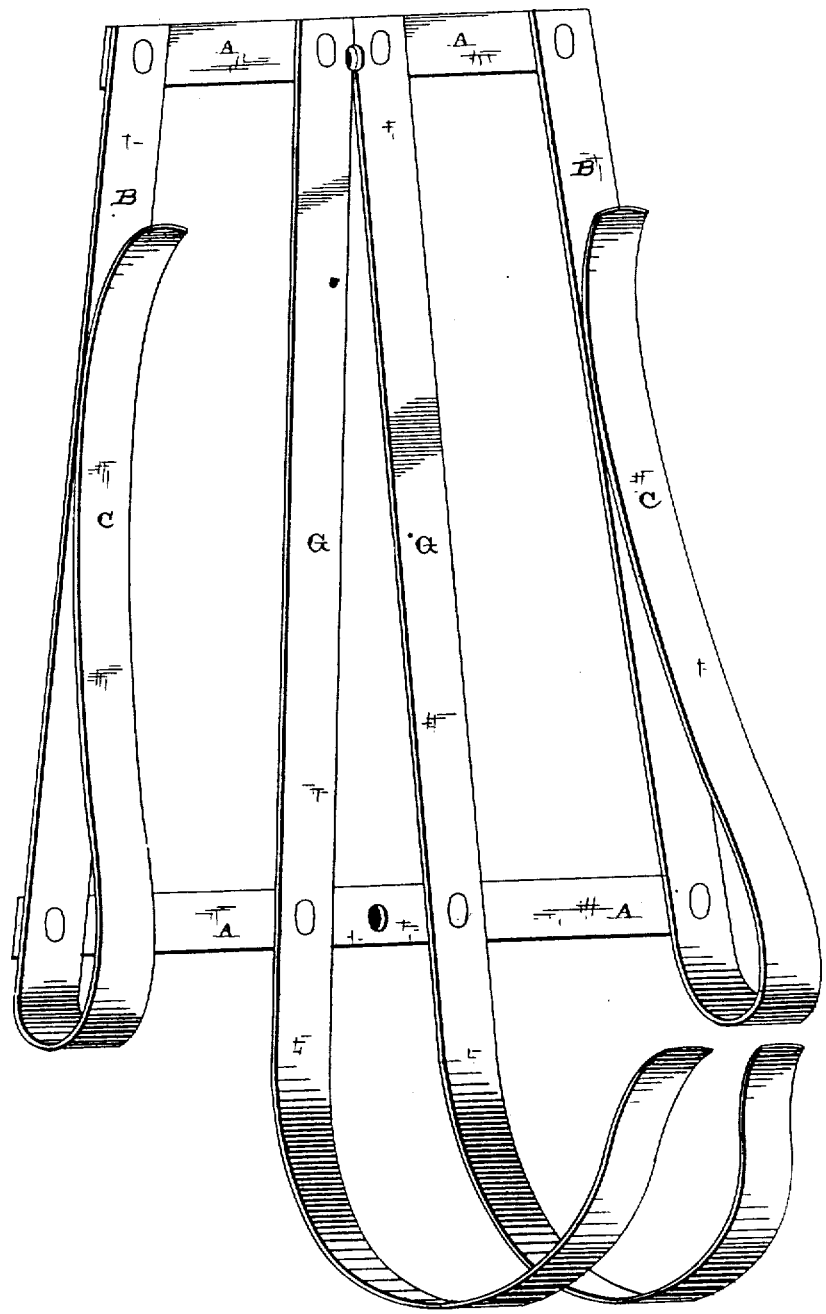
Witnesses.
Louis F. Gardner
E. D. York
Inventor.
S. P. Porter,
per
F. A. Lehmann, Atty.

UNITED STATES PATENT OFFICE.

SANFORD P. PORTER, OF WEST RICHFIELD, OHIO.

BROOM AND DUST-PAN HOLDER.

SPECIFICATION forming part of Letters Patent No. 276,462, dated April 24, 1883.

Application filed January 17, 1883. (No model.)

*To all whom it may concern:*

Be it known that I, S. P. PORTER, of West Richfield, in the county of Summit and State of Ohio, have invented certain new and useful Improvements in Broom and Dust-Pan Holders; and I do hereby declare the following to be a full, clear, and exact description of the invention, such as will enable others skilled in the art to which it pertains to make and use it, reference being had to the accompanying drawing, which forms part of this specification.

My invention relates to an improvement in broom and dust-pan holders; and it consists in the combination of two cross-bars, two outside strips of metal which are secured to the ends of these cross-bars, and which have their lower ends bent upon themselves to form a holder for the dust-pan, and two central strips which have their lower ends curved upward, so as to form suitable supports for the broom, as will be more fully described.

The object of my invention is to construct a holder for both the broom and the dust-pan, which holder can be secured to any suitable support where it can be conveniently reached.

The accompanying drawing represents a perspective of my invention.

A represents two cross-bars, the lower one of which is the longest, and both of which are perforated at their center, so as to allow a nail or a screw to pass through them into a suitable support. Secured to the outer ends of these two cross-bars are the side strips, B, which have their lower ends doubled back upon themselves, as shown, so as to form holders C for the dust-pan. These strips are made of elastic material, and the doubled-back ends form springs which will hold the dust-pan securely enough to prevent it from falling or being easily knocked down. The upper ends of these springs are bent outward, as shown, so that the lower edge of the pan can be readily forced down behind them. This dust-pan holder, consisting of the two cross-bars and the two end strips, can be used independently of the broom-holder, if so desired.

The broom-holder consists of the two central strips, G, which are made to incline from each other at their lower ends, so as to form sufficient space between them to allow the broom-handle to pass through. The lower ends of these central strips are curved upward and outward, so as to allow the head of the broom to rest upon them. These strips G may also be formed of elastic material, so as not to be readily bent out of shape. When this combined holder is secured against the wall both the dust-pan and the broom can be placed upon it, or either one independently of the other. The dust-pan will be placed behind the straws of the broom, and its handle will project upward any suitable distance, so that it can readily be taken hold of without disturbing the broom.

Having thus described my invention, I claim—

A broom and dust-pan holder consisting of the two cross-pieces A, in combination with the side strips, B, having the turned-up ends C, with the central strips, G, having their lower ends turned upward, but separated from each other, substantially as shown.

In testimony whereof I affix my signature in presence of two witnesses.

SANFORD PARKER PORTER.

Witnesses:
ROBERT GARGETT,
SAMUEL D. DETWILER.